Feb. 1, 1955   J. ADAMS ET AL   2,700,792
POULTRY DEFEATHERING METHOD
Filed Nov. 4, 1952   3 Sheets-Sheet 1
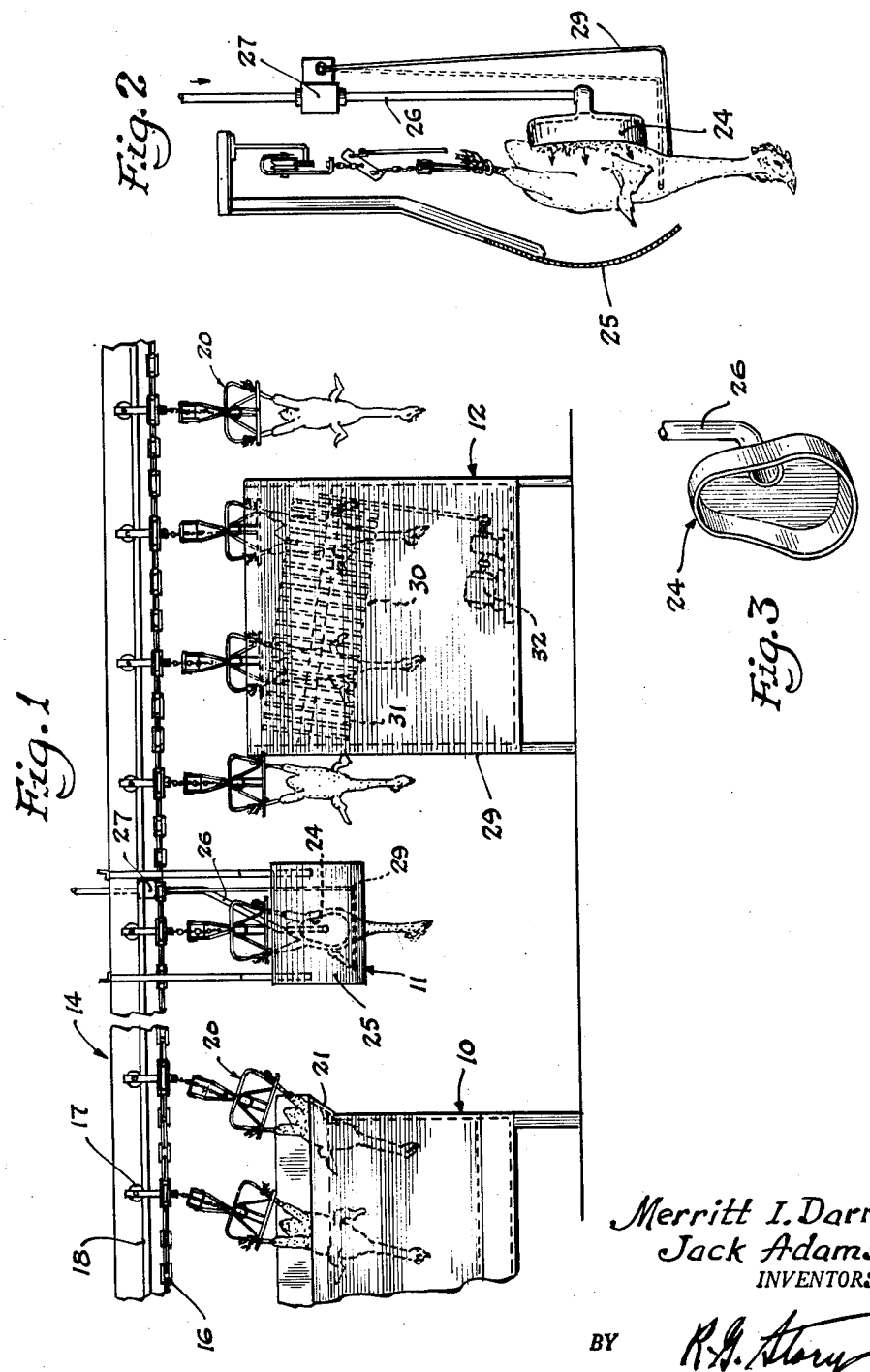
Merritt I. Darrow
Jack Adams
INVENTORS
BY R.J. Story
ATTORNEY Feb. 1, 1955  J. ADAMS ET AL  2,700,792
POULTRY DEFEATHERING METHOD
Filed Nov. 4, 1952  3 Sheets-Sheet 2

Merritt I. Darrow
Jack Adams
INVENTORS

BY
ATTORNEY

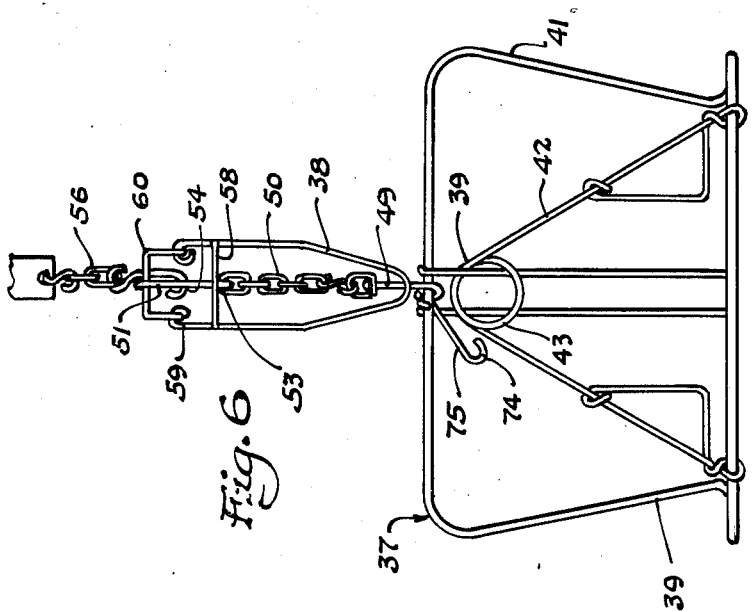
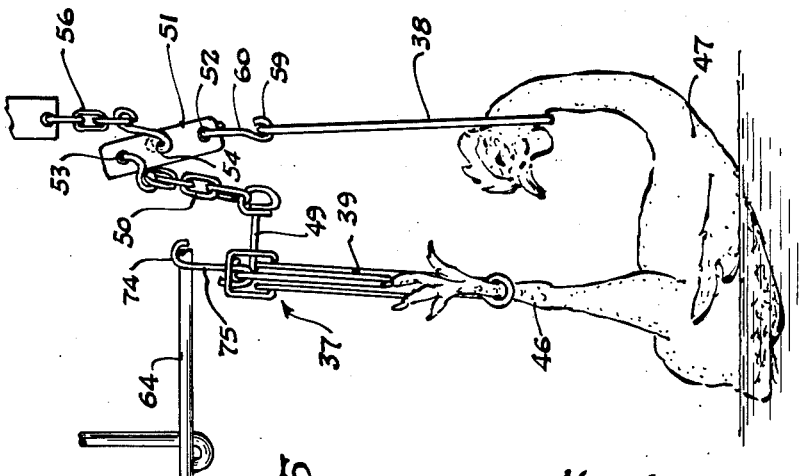
Merritt I. Darrow
Jack Adams
INVENTORS
BY
ATTORNEY

# United States Patent Office 2,700,792
Patented Feb. 1, 1955

2,700,792

POULTRY DEFEATHERING METHOD

Jack Adams and Merritt I. Darrow, Chicago, Ill., assignors to Swift & Company, Chicago, Ill., a corporation of Illinois Application November 4, 1952, Serial No. 318,587

7 Claims. (Cl. 17—45)

This invention relates to a method facilitating the defeathering of fowl. More particularly, the invention provides an improved method which permits a more efficient and complete removal of broken feathers, pin feathers and other matter from the backs of fowl.

In the picking of poultry it is conventional practice to loosen the feathers prior to picking by immersing the fowl in hot water. This practice has proven objectional because of the failure to develop scalding conditions which will loosen all feathers without damaging a portion of the fowl's skin. A lengthy scald at relatively high temperature is desirable from the standpoint of the easy removal of the feathers, but such a scald has its short-comings in that the mechanical pickers commonly used will "bark" or remove outer layers of skin of the bird, spoiling the appearance and lessening the value of the product. For this reason the present practice is a compromise and certain areas of the feathers may prove to be particularly difficult to remove because they do not loosen as readily as the remainder with the operating temperatures employed. The present methods of scalding are particularly objectionable in the processing of birds having poorly feathered backs.

The principal object of the present invention is to provide a method for the scalding of a fowl so as to loosen all back feathers, including pin and broken stubs, and scabby areas without damaging the skin or other portions of the bird.

During the summer months and to some extent throughout the year, the dressing of poorly feathered fowl, which are frequently referred to as "bare backs," is a serious problem to the processing plants because of the difficulty of removing pin feathers and broken stub feathers from the back area. This inefficient removal necessitates a downgrading of the fowl and the resulting profit loss to the processing plant. Generally speaking, in the processing of poultry our improved method contemplates subjecting substantially the whole carcass to a first scald and thereafter applying to the back of the carcass a second selective scald of a higher temperature than the first.

The invention will be more fully understood from the following description read in connection with the accompanying drawings:

Figure 1 illustrates one embodiment of the invention utilizing in succession a conventional scald tank to the far left of the figure, a back scalding unit, and a slant drum picker;

Figure 2 is a side elevation of the back scalding unit of Figure 1;

Figure 3 is a perspective of the steam ejection hood which is a portion of the back scalding unit;

Figure 5 is a side elevation of the shackle used in the embodiment of the invention shown in Figure 4, with the bird positioned for immersing in the shallow scald tank; and Figure 6 is a front elevation of the shackle of Figure 5 as it appears without the bird therein.

Figure 4:
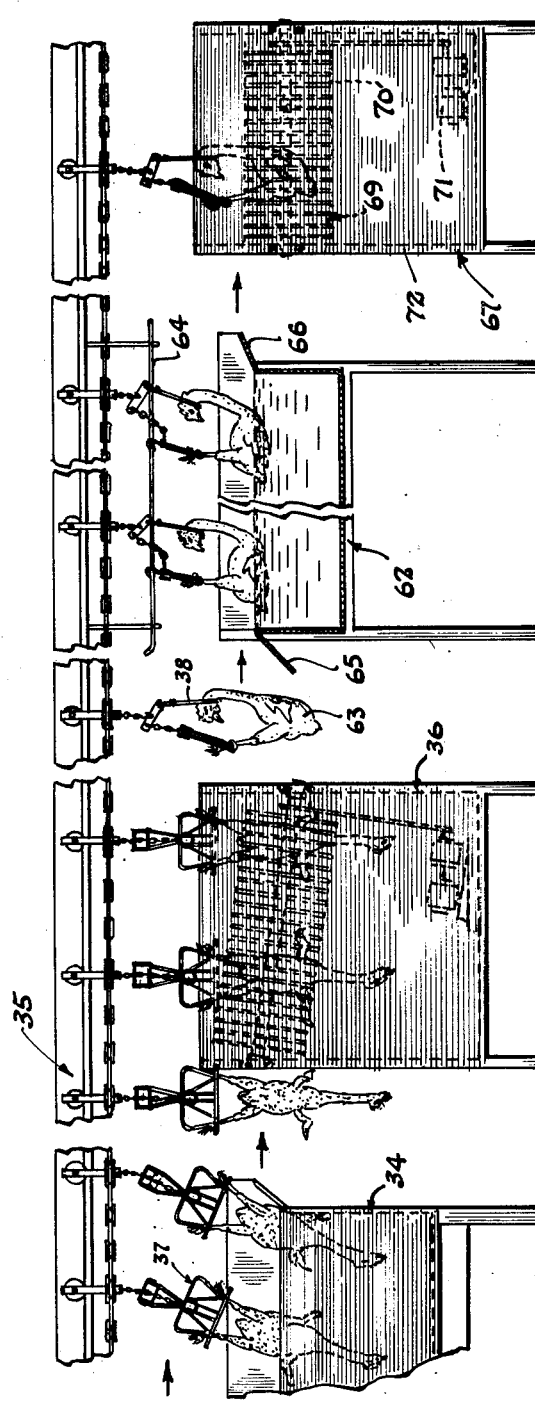
Figure 4 shows another embodiment of the invention which employs in succession from left to right a conventional first scald tank, a slant picker, a shallow second scald tank, and a back picking machine.

In Figure 1 there is shown from left to right a conventional scald tank 10, a back scalding unit 11, and a slant picker 12. The birds are moved progressively from left to right by a conveyor system 14, made up of a horizontal chain 16 supported by several trolleys 17 which ride on a track 18. The trolleys and chain are moved at a uniform rate by a source of power not shown. Several detachable shackles 20 which are adapted for carrying birds are hooked at intervals on the conveyor chain. The shackles may be of any well-known type. A shackle contemplated is that shown and described in the De Vout patent, No. 2,035,948, issued March 31, 1936, or a modification thereof.

The birds first pass through the scalding tank, which tank may be any of the type known to the art that is adaptable to the operation. The temperature of the water of this tank is within the range conventionally employed, i. e., 118°–132° F. A chute 21 at the exit end of the tank slopes outwardly and upwardly in the direction of the line of movement of the birds. This chute lessens the swing of the bird as it falls free of the tank and at the same time reduces the loss of water from the scald tank, caused by the removal of the bird.

Following removal from the scald tank, the fowl being processed next passes through the back scald unit. The back scald unit (best illustrated in Figure 2) is made up of a steam ejection hood 24, a steam deflector 25, spaced from the hood and placed to deflect the steam emitting from the hood, and the necessary steam feed pipes 26 connecting the steam hood to the steam source (not shown). A valve 27 in the steam pipe which is actuated through movement of an operating lever 29 governs the flow of steam to the hood.

The steam feed pipe which extends down from the ceiling past the conveyor carries at its lower end the steam ejection hood at the height of the back of the fowl being processed. The outlet of the steam hood as illustrated is of a configuration that will snugly fit the back of a fowl so as to limit the direct steaming to the back area. The vertical section of the hood illustrated is roughly comparable to the longitudinal section of a pear, with the small end up and adapted to cover the back area of the carcass adjacent the tail. For the protection of the operating personnel, the steam pipe and hood are insulated and the steam deflector is provided to prevent the direct contact by the personnel with the steam blast. The deflector is spaced from the opening of the hood a distance sufficient to provide adequate clearance for the fowl which are moved therebetween. When the bird is in line with the hood, the operator pulls the bird into contact with it, sealing the bird's back against the outlet of the hood. This positioning of the bird trips the operating lever to actuate the valve, thereby opening the steam line to the flow of steam to the hood and the back of the bird. The operation requires only a brief interval. A steaming interval of 1½ to 2 seconds has proven satisfactory with many fowl. When the bird is moved out of contact with the operating lever, the spring-loaded valve closes.

The fowl, following the steaming operation, are moved by the conveyor to the conventional slant picker. The slant picker has a frame 29 which supports two spaced and inclined longitudinal drums 30. The spaced drums have parallel axes and are driven by a motor 32.

The drums carry a plurality of flexible picking fingers 31 made, for example, of rubber. The fowl being processed pass between the adjacent drums where the downwardly moving picking fingers of both drums stroke the carcass to remove substantially all the feathers. From this slant picker the fowl pass to further processing.

With reference to Figure 4, which illustrates another embodiment of the invention, it will be seen that, as before, the fowl are first dipped in a conventional scald tank 34. In the embodiment illustrated, the fowl next pass along a conveyor line 35, identical to the one previously described, to a slant picker 36 of the type previously described. The birds emerging from the picker will frequently have broken stub feathers and scab areas remaining on their backs. This is particularly true of "bare backs."

The shackle 37 employed in the present embodiment, as shown in Figures 5 and 6, has a head hook 38 in addition to a leg gripping means 39 which may be a foot shackle of the type illustrated and described in U. S. Patent No. 2,035,948 to De Vout, patented March 31, 1936.

The gripping means of the shackle includes a frame 41 and a pair of arms 42. The arms are formed from a single piece of spring steel which is coiled at the center to form a spring 43 urging the two arms apart. The frame forms a pair of spaced sides against which the arms are urged by the spring so that when the legs 46 of a bird 47 are inserted between the sides of the frame and the arms, the two cooperate to grip and hold the legs of the bird.

A rotatable hook 49 and a chain 50 support the gripping means from a teeter bar 51. The teeter bar has two holes 52 and 53 adjacent either end thereof and an intermediate opening 54. The end link of the chain 50 is looped through the hole 53 at one end of the teeter bar. A supporting chain 56 is secured at one end through the intermediate opening 54 in the teeter bar and at the other end to the overhead conveyor.

The head hook 38 is V-shaped, with an upper crossbar 58. The upper end of the hook has a pair of loops 59 by which the hook is secured to the teeter bar by means of a link 60. A center portion of the link passes through the opening 52 of the teeter bar, and the two ends of the link are secured to the loops 59.

Following the slant picker, in the embodiment illustrated, a portion of the back of the carcass is immersed in the hot water of a shallow scald tank 62. Prior to entering the shallow scald tank, the head of each fowl is placed by an operator in the head hook 38 of its respective shackle to position the fowl as shown by the carcass numbered 63 of Figure 4. This position, while satisfactory for the subsequent picking operation, places the tail down and the back substantially vertical to the surface of the water of the scald tank. To obtain the desired position of the bird, as best shown in Figure 5, the leg gripping portion of the shackle is lifted upward by the operator, and the open hook 74 of a hanger 75 attached to the leg gripping portion is placed over a guide bar 64 which runs the length of the shallow scald tank. The guide bar is at such a height above the scald tank as to place the back of the carcass more nearly in a plane parallel to the water surface. After positioning the carcass as described, the carcass next enters the shallow scald tank.

The water of the shallow tank which is in the temperature range of 140–160° F. is at such a level that the fowl passing through the tank have only their tails and a portion of their backs and hip areas immersed. The length of the tank may vary, i. e., a longer scald requires a longer tank, and a scald of a relatively short interval a shorter tank. Time intervals of a fraction of a second to ten seconds have been used, depending on the condition of the bird and the temperature of the scald.

The second scald tank has an entering chute 65 and an exiting chute 66 to facilitate the movement of the fowl in and out of the water. The water of this tank is heated and the temperature controlled in the manner well known to the art.

Following the second dipping operation, the bird is subjected to a second defeathering operation in a conventional back picking machine 67. This back picking machine includes a pair of horizontally supported and spaced drums 69 which carry a plurality of outwardly extending picking fingers 70. The drums are driven by a motor 71 and are rotatably supported at their respective opposite ends by a frame 72. Since the guide bar 64 ends before the back picking machine, the carcass still held by its legs and neck balances on the teeter bar of the shackle to assume the position illustrated. The picking fingers of the two rotating drums beat downwardly on the carcass which is moved therebetween to remove the remaining feathers of the back. From this last-described operation, the fowl pass on to further processing.

It should be understood that in both of these embodiments the picking machines illustrated and the sequence in which they are employed are only illustrative and that different types of machines may be used in any order desired.

In operation of the embodiment of Figure 1, the individual birds suspended from the conveyor are first scalded in a conventional scald tank. While the particular local conditions will vary the exact details of operation to a certain extent, the birds are generally left in this first scald tank for a period of from 50–90 seconds, with the water temperature of approximately 118°–132° F. This length of scalding is sufficient to loosen most of the body feathers, but not so long as to cause any barking of the skin of the body during the picking operation. After leaving the first scald, the birds proceed through the back scald unit where a selective steam scald is applied only to the back for a limited period of approximately 1½ seconds to 2 seconds. The two scalds loosen all the feathers of the body, including the back feathers, to an extent that it is much easier to defeather than has been previously possible with the conventional practice of scalding the whole bird. The last operation illustrated is a defeathering operation in a conventional slant, double drum picker.

In the practice of the invention of the second embodiment illustrated in Figure 4, the birds, as before, are passed through a conventional scald tank which is operated under the conditions previously described, and from there through a conventional slant, double drum picker. Following the picking operation, the head of the bird is placed in the head holder of the shackle and the shackle placed on the guide bar to position the carcass with its back approaching the horizontal. In this position the bird is dipped in the water of the second scald tank which is within the temperature range of 140°–160° F. Only the tail, the back, and a portion of the hip area of the birds are dipped in the water of the second tank. Subsequent to the application of this selective second scald, the birds are again subjected to a defeathering operation, this time in a conventional back-picking machine. From the back-picking machine the fowl pass on to further processing.

Obviously, many modifications and variations of the invention, as hereinbefore set forth, may be made without departing from the spirit and scope thereof, and therefore only such limitations should be imposed as are indicated in the appended claims.

We claim:

1. In the processing of poultry, the improvement of subjecting substantially the whole carcass to a first scald, and thereafter subjecting the back of the poultry to a second scald of a higher temperature than the first.

2. A method substantially as described above in claim 1 wherein water is used as the second scald.

3. A method substantially as described above in claim 1 wherein steam is used as the second scald.

4. In the processing of pin-feathered poultry, the improvement of dipping the poultry in a water bath, removing the poultry from the bath, and thereafter applying a steam scald limited to the back area.

5. A method substantially as described in claim 4 wherein the steam is applied for a period of 1½ to 2 seconds.

6. In the processing of poultry, the improvement of dipping the whole carcass in water having a temperature within the range of 118°–132° F., removing the carcass from the water, and subsequently immersing the back area in water within the temperature range of 140°–160° F.

7. In the processing of poultry preparatory to the picking of feathers therefrom by means of a mechanical picker, the steps of dipping the poultry in a heated liquid within the temperature of from 118–132° F. for a period of 50–90 seconds, and subjecting the back area of the poultry to a selective steam scald for a period of 1½ to 2 seconds.

References Cited in the file of this patent

UNITED STATES PATENTS

| Number | Name | Date |
|---|---|---|
| 944,800 | MacConnell | Dec. 28, 1909 |
| 1,632,588 | Braun | June 14, 1927 |
| 1,672,555 | Barker et al. | June 5, 1928 |
| 1,730,964 | Barker et al. | Oct. 8, 1929 |
| 2,015,058 | Bruce | Sept. 24, 1935 |
| 2,198,898 | Winters, Jr. | Apr. 30, 1940 |
| 2,549,070 | Drews | Apr. 17, 1951 |